US00RE38720E

(19) United States
(12) Reissued Patent
Song

(10) Patent Number: US RE38,720 E
(45) Date of Reissued Patent: Apr. 12, 2005

(54) IMAGE MOTION COMPENSATING ADDRESS GENERATOR

(75) Inventor: Gi Hwan Song, Seoul (KR)

(73) Assignee: LG Electronics, Inc., Seoul (KR)

(21) Appl. No.: 09/287,345

(22) Filed: Apr. 7, 1999

Related U.S. Patent Documents

Reissue of:
(64) Patent No.: 5,619,282
Issued: Apr. 8, 1997
Appl. No.: 08/489,970
Filed: Jun. 13, 1995

(30) Foreign Application Priority Data

Jun. 13, 1994 (KR) ..... 13255/1994

(51) Int. Cl.[7] ..... H04N 7/36
(52) U.S. Cl. ..... 348/716; 375/240.16
(58) Field of Search ..... 348/716, 416.1, 348/413.1, 714, 718; 375/240.12, 240.16; H04N 7/36

(56) References Cited

U.S. PATENT DOCUMENTS 5,379,076 A 1/1995 Song
5,442,402 A 8/1995 Sohn et al. ..... 348/416.1
5,455,908 A 10/1995 Ishida
5,457,481 A 10/1995 Sohn et al. ..... 375/240.16
5,459,516 A 10/1995 Song ..... 348/716
5,469,228 A 11/1995 Kim et al. ..... 348/716
5,473,378 A 12/1995 Tamitani
5,539,466 A 7/1996 Igarashi et al.
5,541,658 A 7/1996 Ishiwata ..... 348/716

*Primary Examiner*—Nhon Diep
(74) *Attorney, Agent, or Firm*—Fleshner & Kim

(57) ABSTRACT

An image motion compensating address generator is disclosed including a mode selector for selecting a field mode or frame mode according to a video mode signal and a slice position signal, an address selection controller for controlling the generation of addresses according to the video mode signal and a motion coding type signal, a Y-direction read address generator for producing a Y-direction read address in units of processed block, an X-direction read address generator for dividing the processed block into four phases in the X-direction and generating an X-direction read address, an X-direction write address generator for delaying the processed-block position signal and a field processed-block clock signal, and generating the X-direction write address of four phases, a Y-direction write address generator for producing a Y-direction write address, and a read & write controller for selecting outputting the X-direction and Y-direction read and write addresses according to a read/write selection toggle signal and an X-direction motion vector signal.

55 Claims, 7 Drawing Sheets

IMAGE MOTION COMPENSATING ADDRESS GENERATOR

Matter enclosed in heavy brackets [ ] appears in the original patent but forms no part of this reissue specification; matter printed in italics indicates the additions made by reissue.

BACKGROUND OF THE INVENTION

The present invention relates to an image motion compensator for accepting the high level of the main profile of MPEG II (moving picture experts group II) algorithm selected by a high-definition television (HDTV), and more particularly, to an image motion compensating address generator for generating an address required in controlling a frame-unit memory.

High-media products such as HDTV are based on the recently confirmed MPEG II algorithm. For this reason, an image motion compensator, which accepts the MPEG II algorithm and performs image motion compensation, is indispensable.

Generally, for image motion compensation, the image motion compensator uses a frame memory. In this case, an address for controlling the frame memory must be generated. However, the high level of the main profile of the MPEG II algorithm was established recently. Therefore, there is no image motion compensator using it.

For reference, the main level of the main profile of the MPEG II algorithm has been used according to a conventional technology. Recently, the high level of the main profile of the MPEG II algorithm was determined, obtaining an image output at a high resolution and high speed. Accordingly, there has become necessary an address generator, which is not merely an address generator but has a high-speed data processing capability required by the HDTV and accepts the high level of the main profile of the MPEG II algorithm.

SUMMARY OF THE INVENTION

Therefore, it is an object of the present invention to provide an image motion compensating address generator for producing an address required in controlling a motion compensating frame memory and accepting the MPEG II algorithm.

To accomplish the object of the present invention, there is provided an image motion compensating address generator comprising: mode selector means for selecting a field mode or frame mode according to a video mode signal indicative of whether an input video signal is a frame unit or field unit and a slice position signal indicative of the position of slice, to thereby control the video signal to be processed; address selection controller means for controlling the generation of addresses according to the video mode signal and a motion coding type signal indicative of the video processing mode of a block to be processed; Y-direction read address generator means for producing a Y-direction read address in units of processed block by using the signal output from the mode selector means according to the address selection controller means, a Y-direction motion vector signal, and a vertical field selection signal; X-direction read address generator means for dividing the processed block into four phases in the X direction and generating an X-direction read address by using a processed-block position signal indicative of the position of the processed block and an X-direction motion vector signal according to the address selection controller means; X-direction write address generator means for delaying the processed-block position signal and a field processed-block clock signal, and generating the X-direction write address of four phases, to thereby write read-out video data; Y-direction write address generator means for producing a Y-direction write address by using the signal output from of the mode selector means according to the address selection controller means and the X-direction write address generator means, to thereby write read-out video data; and read & write controller means for selectively outputting the X-direction and Y-direction read and write addresses according to a read/write selection toggle signal and an X-direction motion vector signal among the X-direction and Y-direction read and write addresses output from the Y-direction read address generator means, X-direction read address generator means, X-direction write address generator means and Y-direction write address generator means.

BRIEF DESCRIPTION OF THE ATTACHED DRAWINGS

DETAILED DESCRIPTION OF THE INVENTION

Hereinafter, a preferred embodiment of the present invention will be described with reference to the attached#drawings.

Figure 1:
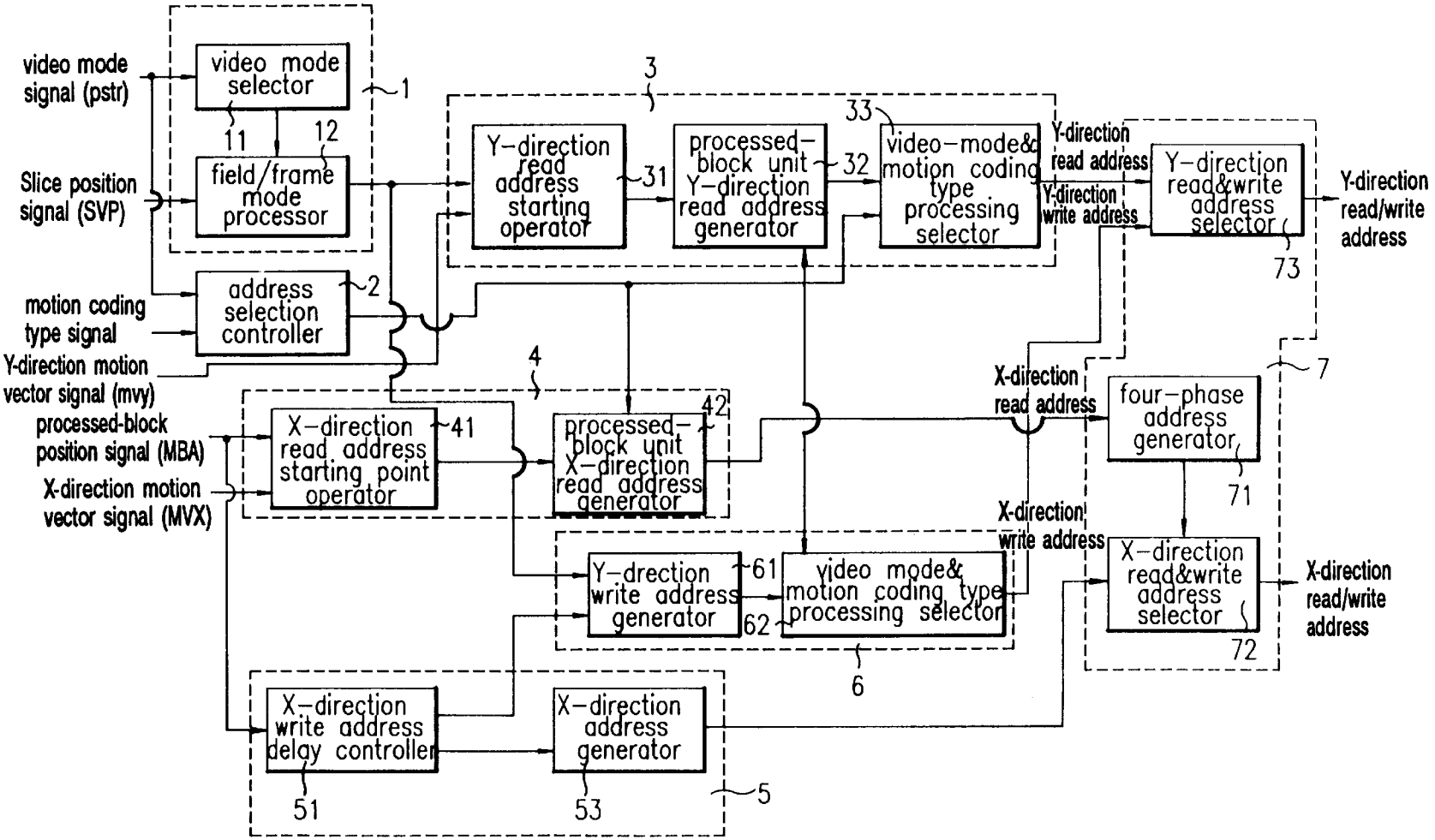
FIG. 1 is a block diagram of the whole configuration of an image motion compensating address generator of the present invention.

Referring to FIG. 1, an image motion compensating address generator of the present invention comprises a mode selector 1, an address selection controller 2, a Y-direction read address generator 3, an X-direction read address generator 4, an X-direction write address generator 5, a Y-direction write address generator 6, and a read & write controller 7.

Mode selector 1 comprises a video mode selector 11 for determining whether an address is generated in a field mode or frame mode according to a video mode signal pstr1 or pstr 0 indicative of whether an input video signal is frame or field unit, and a field/frame mode processor 12 for establishing the position of slice in the field mode and frame mode according to a signal output from video mode selector 11 and a slice position signal SVP indicative of the position of slice. The mode selector selects the field mode or frame mode according to input video mode signal pstr1 or pstr0 and slice position signal SVP, to thereby control the video signal to be processed.

Address selection controller 2 controls the generation of addresses according to video mode signal pstr1 or pstr0 and a motion coding type signal indicative of the video processing mode of a block to be processed, that is, a macroblock, which is the unit of processing the video signal.

Y-direction read address generator 3 comprises a Y-direction read address starting point operator 31 for operating the Y-direction starting point of a processed block to read, according to the signal output from field/frame mode processor 12 and a Y-direction motion vector signal mvy indicative of the degree of Y-direction motion, a processed-block unit Y-direction read address generator 32 for generating Y-direction read addresses of several modes so that the signal output from Y-direction read address starting point operator 31 coincides with the processed block, and a video mode & motion coding type processing selector 33 for including into one bit of the lower level a vertical field selection signal mvfs for selecting a upper or lower field according to motion information, out of the signals output from processed-block unit Y-direction read address generator 32 according to address selection controller 2, to thereby outputting a Y-direction read address fit for the respective modes. The Y-direction read address generator produces the Y-direction read address in units of processed block by using the signal output from field/frame mode processor 12 of mode selector 1 according to address selection controller 2, Y-direction motion vector signal mvy, and vertical field selection signal mvfs.

X-direction read address generator 4 comprises an X-direction read address starting point operator 41 for operating the X-direction starting point of the processed block to read by using a processed-block position signal MBA indicative of the X-direction position of the processed block and an X-direction motion vector signal mvx indicative of the degree of X-direction motion, and a processed-block unit X-direction read address generator 42 for dividing the processed block into four phases and generating the X-direction read address by using the signal output from X-direction read address starting point operator 41 according to address selection controller 2. The X-direction read address generator divides the processed block into four phases in the X direction and generates the X-direction read address by using processed-block position signal MBA and X-direction motion vector signal mvx according to address selection controller 2.

X-direction write address generator 5 comprises an X-direction write address delay controller 51 for delaying processed-block position signal MBA for a predetermined time so as to rewrite read-out video data, and an X-direction write address generator 53 for dividing the processed block into four phases and generating the X-direction write address by using the signal output from X-direction write address delay controller 51. The X-direction write address generator delays processed-block position signal MBA and generates the X-direction write address of four phases, to thereby write the read-out video data.

Y-direction write address generator 6 comprises a Y-direction write address generator 61 for generating a Y-direction write address in units of processed block by using the signal output from field/frame mode processor 12 of mode selector 1 according to X-direction write address delay controller 51 of X-direction write address generator 5, and a video mode & motion coding type processing selector 62 for selectively outputting the Y-direction write address fit for the respective modes among the signals output from Y-direction write address generator 61 according to address selection controller 2. In order to write the read-out video data, the Y-direction write address generator produces the Y-direction write address by using the signal output from field/frame mode processor 12 of mode selector 1 according to address selection controller 2 and X-direction write address delay controller 51 of X-direction write address generator 5.

Read & write controller 7 comprises a Y-direction read & write selector 73 for selectively outputting one of the Y-direction read address and Y-direction write address output from video mode & motion coding type processing selector 33 of Y-direction read address generator 3 and video mode & motion coding type processing selector 62 of Y-direction write address generator 6 according to a read/write selection toggle signal for controlling the read & write operation, a four-phase address generator 71 for compensating for the X-direction read address output from processed-block unit X-direction read address generator 42 of X-direction read address generator 4 according to the read/write selection toggle signal, and an X-direction read & write selector 72 for selecting one of the X-direction read address and X-direction write address output from the four-phase address generator 71 and X-direction write address generator 53 of X-direction write address generator 5 and dividely outputting the selected address in four phases according to the read/write selection toggle signal. The read & write controller selectively outputs the X-direction and Y-direction read and write addresses according to the read/write selection toggle signal among X-direction and Y-direction read and write addresses output from Y-direction read address generator 3, X-direction read address generator 4, X-direction write address generator 5 and Y-direction write address generator 6.

The operation of the image motion compensating address generator will be explained below.

A two-bit motion coding type signal indicative of the video processing mode of 16-by-16 pixels of a macroblock, that is, the processed block which is the unit of processing the video signal, is input to address selection controller 2 along with video mode signal pstr1 or pstr0 indicative of whether the input video signal is frame or field unit. In order to determine the compensating method of the processed block unit, the input signal outputs a processing selection control signal for controlling the signal to be processed according to modes, and outputs a preset signal for presetting processed-block unit X-direction read address generator 42 when it counts.

Specifically, if video mode signal pstr1 or pstr0 is "11" in the frame mode and the motion coding type signal is "01," the mode becomes a field base mode in which the video signal of the processed block is processed in units of field. If video mode signal pstr1 or pstr0 is "11" in the frame mode and the motion coding type signal is "10," the mode becomes a frame base mode in which the video signal of the processed block is processed in units of frame. If video mode signal pstr1 or pstr0 is "01" or "10" in the field mode and the motion coding type signal is "01," the mode becomes the field base mode in which the video signal of the processed block is processed in units of field. If video mode signal pstr1 or pstr0 is "01" or "10" in the frame mode and the motion coding type signal is "10," the mode becomes a 16-by-8 base mode in which the processed block is processed in 16-by-8 units, which is half the macroblock.

Video mode signal pstr1 or pstr0 indicative of whether the input video signal is frame or field unit determines whether video mode selector 11 of mode selector 1 generates its address in the field or frame mode.

Slice position signal SVP indicative of the Y-direction position is output from field/frame mode processor 12 as a signal for setting the position of slice so that it is fit for the field mode and frame mode, according to the signal output from video mode selector 11.

If video mode signal pstr1 or pstr0 is "11," the input video signal indicates the frame unit. In this case, a signal for controlling the address to be generated in the frame mode in which the video signal is processed in units of frame is output from video mode selector 11 so that slice position signal SVP passes through field/frame mode processor 12 without change.

If video mode signal pstr1 or pstr0 is "01," the input video signal indicates the upper field in units of field. In this case, a signal for controlling the address to be generated in the field mode in which the video signal is processed in units of field is output from video mode selector 11 so that slice position signal SVP is doubled and thereby a signal twice slice position signal SVP is output from field/frame mode processor 12.

If video mode signal pstr1 or pstr0 is "10," the input video signal indicates the lower field in units of field. In this case, a signal for controlling the address to be generated in the field mode in which the video signal is processed in units of field is output from video mode selector 11 so that slice position signal SVP is doubled and thereby a signal twice slice position signal SVP is output from field/frame mode processor 12.

The operation of generating the X-direction and Y-direction read addresses according to the signals output from mode selector 1 and address selection controller 2 will be explained below.

Slice position signal SVP or the signal twice slice position signal SVP output from field/frame mode processor 12 is input to Y-direction read address starting point operator 31 along with Y-direction motion vector signal mvy so that the Y-direction starting point of the processed block to read is operated.

The signal output from field/frame mode processor 12 is multiplied by 16, the Y-direction size of the processed block, in Y-direction read address starting point operator 31, in case that for instance, the processed block is a macroblock of 16-by-16 pixels. The multiplied signal is added to Y-direction motion vector signal mvy so that the Y-direction starting point of the processed block to read is output.

The signal corresponding to the Y-direction starting point of the processed block to read, which is the signal output from Y-direction read address operator 31, is input to processed-block unit Y-direction read address generator 32. When main clocks mclk are input as many as the pixels divided into four phases in the X direction, the signal corresponding to the Y-direction starting point of the processed block to read increases by 1 and 2, generating the Y-direction read address of the frame and field modes fit for the processed block.

For instance, in case that the processed block is the macroblock of 16-by-16 pixels, whenever four main clocks mclk are applied corresponding to the number of pixels divided into four phases in the X direction, the signal corresponding to the Y-direction starting point of the processed block to read increases by 1 and 2, generating the Y-direction read address of the frame and field modes.

The Y-direction read address of the frame and field modes output from processed-block unit Y-direction read address generator 32 is selected by one in video mode & motion coding type processing selector 33 by the processing selection control signal output from address selection controller 2.

Here, when the Y-direction read address of the field mode is selected by address selection controller 2, vertical field selection signal mvfs is contained in one bit of the lower level, outputting the Y-direction read address according to the upper or lower field.

In case of the upper field, vertical field selection signal mvfs becomes "0." In case of the lower field, vertical field selection signal mvfs becomes "1," controlling video mode & motion coding type processing selector 33.

When the processed block is the macroblock of 16-by-16 pixels, the Y-direction read address is given as shown in the following table <TABLE 1>, according to the respective modes.

TABLE 1

| (A) | (B) | | (C) | | (D) | |
|---|---|---|---|---|---|---|
| 0 | 0 | 1 | 0 | 1 | 0 | 1 |
| 1 | 2 | 3 | 2 | 3 | 2 | 3 |
| 2 | 4 | 5 | 4 | 5 | 4 | 5 |
| 3 | 6 | 7 | 6 | 7 | 6 | 7 |
| 4 | 8 | 9 | 8 | 9 | 8 | 9 |
| 5 | 10 | 11 | 10 | 11 | 10 | 11 |
| 6 | 12 | 13 | 12 | 13 | 12 | 13 |
| 7 | 14 | 15 | 14 | 15 | 14 | 15 |
| 8 | 16 | 17 | 16 | 17 | 16 | 17 |
| 9 | 0 | 1 | 18 | 19 | 0 | 1 |
| 10 | 2 | 3 | 20 | 21 | 2 | 3 |
| 11 | 4 | 5 | 22 | 23 | 4 | 5 |
| 12 | 6 | 7 | 24 | 25 | 6 | 7 |
| 13 | 8 | 9 | 26 | 27 | 8 | 9 |
| 14 | 10 | 11 | 28 | 29 | 10 | 11 |
| 15 | 12 | 13 | 30 | 31 | 12 | 13 |
| 16 | 14 | 15 | 32 | 33 | 14 | 15 |
| 17 | 16 | 17 | 34 | 35 | 16 | 17 |

As indicated in <TABLE 1>, there are two kinds of form in which the Y-direction read address is generated. First, as in column (A) of <TABLE 1>, the Y-direction read addresses of the processed block all are sequentially output in the frame mode. Second, as in columns (B), (C) and (D) of <TABLE 1>, the Y-direction read addresses of the processed block are doubled and read out every other line by the multiple of 2 and a value added to the multiple of 2 by "1."

If video mode signal pstr1 or pstr0 corresponding to the first case is "11" and the motion coding type signal is "10" in the frame base mode, the Y-direction read addresses are output in "0, 1, 2, 3, . . . 16, 17," as shown in column (A) of <TABLE 1>, regardless of vertical field selection signal mvfs. Here, addresses "16 and 17" corresponding to the succeeding macroblock are generated at the end of the Y-direction addresses so that they are to be used when necessary to be read out additionally in case that the half pel compensation is employed.

If video mode signal pstr1 or pstr0 corresponding to the first case is "11," the motion coding type signal is "01" in the field base mode, and vertical field selection signal mvfs is "0," as shown in column (B) of <TABLE 1>, the Y-direction read addresses are output in "0, 2, 4, 6, . . . 16," in the upper field. If vertical field selection signal mvfs is "1," the Y-direction read addresses are output in "1, 3, 5, 7, 9, . . . 17," in the lower field. Addresses "0, 2, 4, 6, . . . 16" and "1, 3, 5, 7, 9, . . . 17" are output again because the addresses are reset by the processing selection control signal output from address selection controller 2. Here, addresses "16 and 17" corresponding to the succeeding macroblock are generated at the end of the Y-direction read addresses so that they are to be used when necessary to be read out additionally in case that the half pel compensation is employed.

If video mode signal pstr1 or pstr0 corresponding to the second case is "01" or "10," the motion coding type signal is "01" in the field base mode, and vertical field selection signal mvfs is "0," as shown in column (C) of <TABLE 1>, the Y-direction read addresses are output in "0, 2, 4, 6, . . . 16," in the upper field. If vertical field selection signal mvfs is "1," the Y-direction read addresses are output in "1, 3, 5, 7, 9, . . . 17," in the lower field Sequentially, addresses "18, 20, 30, 32, 34" and "19, 21, . . . , 31, 33, 35" are output because the addresses are not reset by the processing selection control signal output from address selection controller 2. Here, addresses "32 and 34" and "33 and 35" corresponding to the succeeding macroblock are generated at the end of the Y-direction read addresses so that they are to be used when necessary to be read out additionally in case that the half pel compensation is employed.

If video mode signal pstr1 or pstr0 corresponding to the second case is "01" or "10," the motion coding type signal is "10" in the 16-by-8 base mode, and vertical field selection signal mvfs is "0," as shown in column (D) of <TABLE 1>, the Y-direction read addresses are output in "0, 2, 4, 6, . . . 16," in the upper field. If vertical field selection signal mvfs is "1," the Y-direction read addresses are output in "1, 3, 5, 7, 9, . . . 17," in the lower field. Sequentially, addresses "0, 2, 4, 6, . . . 16" and "1, 3, 5, 7, 9, . . . 15, 17" are output again because the addresses are reset by the processing selection control signal output from address selection controller 2. Here, addresses "16 and 17" corresponding to the succeeding macroblock are generated at the end of the Y-direction read addresses so that they are to be used when necessary to be read out additionally in case that the half pel compensation is employed.

As stated above, since the address generating forms are divided into two according to one bit of the high level of the motion coding type signal, only one bit of the high level of the two bit motion coding type signal can be used in control.

Processed-block position signal MBA indicative of the X-direction position of the processed block is input to X-direction read address starting point operator 41 along with X-direction motion vector signal mvx so that the X-direction starting point of the processed block to read is operated.

Processed block position signal MBA is multiplied by 16, the X-direction size of the processed block, in X-direction read address starting point operator 41, in case that for instance, the processed block is a macroblock of 16-by-16 pixels. The multiplied signal is added to X-direction motion vector signal mvx so that the X-direction starting point of the processed block to read is output.

The signal corresponding to the X-direction starting point of the processed block to read, which is the signal output from X-direction read address operator 41, is input to processed-block unit X-direction read address generator 42, increasing by one whenever main clock mclk is produced. When main clocks mclk are input as many as the pixels divided into four phases in the X direction, the signal corresponding to the X-direction starting point of the processed block to read is preset according to address selection controller 2 and then increases by one whenever main clock mclk is produced. This procedure is repeated until one processed-block all is read, that is, until the Y-direction read addresses of the block all are produced, generating the X-direction read address. The process of generating the X-direction and Y-direction read addresses will be described below.

First, the signal output from field/frame mode processor 12 and Y-direction motion vector signal mvy are operated in Y-direction read address starting point operator 31, outputting the Y-direction read address corresponding to the Y-direction starting point of the processed block to read.

Processed-block position signal MBA and X-direction motion vector signal mvx are operated in X-direction read address starting point operator 41, outputting the X-direction read address corresponding to the X-direction starting point of the processed block to read. By doing so, the starting points of the processed block to read can be obtained.

The X-direction read address corresponding to the X-direction starting point of the processed block to read is produced, increasing by one whenever main clock mclk is input in processed-block unit X-direction read address generator 42. For instance, in case that the processed block is the macroblock of 16-by-16 pixels, whenever four main clocks mclk are produced, corresponding to the number of pixels in which the processed block is divided into four phases according to address selection controller 2, the signal corresponding to the X-direction starting point is preset and increases from the beginning.

Whenever the X-direction read address increases by one and is preset, that is, when four main clocks mclk are produced, the Y-direction read address corresponding to the Y-direction starting point of the processed block to read increases by one or two, corresponding to the frame mode and field mode, and then is input to video mode & motion coding type processing selector 33.

The Y-direction read addresses output from processed-block unit Y-direction read address generator 32 are selected into one of the two frame mode and field mode according to the processing selection control signal output from address selection controller 2.

The operation of generating the X-direction and Y-direction write addresses according to the signal output from mode selector 1 and address selection controller 2 will be described below in detail.

Processed-block position signal MBA delays video data read out by X-direction write address delay controller 51 for a predetermined period for the purpose of rewriting. This can be explained in this way. The video signal is stored in a memory in units of frame. When a succeeding frame is input, video data of the preceding frame is read out and output, and video data of the current frame is read out, compensated for motion, and then stored in the memory which stores the preceding frame. The succeeding frame is stored in the memory which stores the current frame. Therefore, a predetermined time of delay is required until read video data are compensated for motion and rewritten.

Here, until video data of one frame is read, compensated for motion, and rewritten in the memory, 311 main clocks mclk are generated. While the 311 main clocks mclk are generated, processed-block position signal MBA input to X-direction write address delay controller 51 must be delayed.

Processed-block position signal MBA delayed and output from X-direction write address delay controller 51 is input to X-direction write address generator 53, dividing the processed block into four phases in the X direction and generating the X-direction write address according to main clock mclk.

For instance, in case that the processed block is the 16-by-16 macroblock, the block is divided into four phases in the X direction. Whenever the main clock is input, the X-direction write address corresponding to processed-block position signal MBA is generated by increasing by one. When four main clocks mclk are input, the X-direction write address is preset, producing the X-direction write address corresponding to processed-block position signal MBA repeatedly from the beginning. Whenever four main clocks mclk are input, the X-direction write address is preset so that only the lower two bits are counted.

Slice position signal SVP or a signal double slice position signal SVP output from field/frame mode processor 12 increases by one or two in Y-direction write address generator 61 according to X-direction write address delay controller 51, when main clock mclk is input as many as pixels in which the processed block is divided into four phases in the X direction. By doing so, the Y-direction write address of the frame mode and field mode is generated to be fit for the processed block.

For instance, in case that the processed block is the 16-by-16 macroblock, whenever four main clocks mclk are applied corresponding to pixels divided into four phases in the X direction, the signal increases by one or two, generating the Y-direction write address of the frame mode and field mode. The Y-direction write address of the frame mode and field mode output from Y-direction write address generator 61 is selected into one mode in video mode & motion coding type processing selector 62, by the processing selection signal output from address selection controller 2.

The operation of generating the X-direction and Y-direction write addresses will be explained below.

First, in order to delay the generation of the X-direction write address as long as the time during which data read by X-direction write address delay controller 51 is rewritten in the frame-unit memory after several processes, processed-block position signal MBA is delayed and input to X-direction write address generator 53.

Delayed processed-block position signal MBA increases by one whenever main clock mclk is input to X-direction write address generator 53, producing the X-direction write address. In case that the processed block is the macroblock of 16-by-16, when four main clocks mclk, which is the number of pixels in which the processed block is divided into four phases, the signal is preset so that the X-direction write address corresponding to processed-block position signal MBA increases repeatedly from the beginning.

Whenever the X-direction read address increases by one and is preset, that is, whenever four main clocks mclk are produced, the Y-direction write address corresponding to the signal output from field/frame mode processor 12 increases by one and two, corresponding to the frame mode and field mode. The address is input to video mode & motion coding type processing selector 62.

The Y-direction write addresses output from Y-direction write address generator 61 are selected into one of the frame mode and field mode according to the processing selection control signal output from address selection controller 2.

The X-direction read address output from processed-block unit X-direction read address generator 42 is input to four-phase address generator 71 of read & write controller 7, and divided into four phases by the read/write selection toggle signal and the lower two bits bmvx 0, 1, and fmvx 0, 1 of the X-direction motion vector signals of the backward and forward frames. The sequence of compensation and reading of the addresses is determined, and then the X-direction read addresses are output sequentially in the four phases.

The X-direction write address output from X-direction write address generator 53 and the four-phase X-direction read address output from four-phase address generator 71 are input to X-direction read & write selector 72 of read & write controller 7. Reading and writing of these addresses are determined and selected according to the read/write selection toggle signal.

The Y-direction read address and Y-direction write address output from video mode & motion coding type processing selectors 33 and 62 are input to Y-direction read & write selector 73 of read & write controller 7. Reading and writing of these addresses are determined and selected according to the read/write selection toggle signal.

The detailed configuration and operation of the respective components of the present invention will be described with reference to FIGS. 2–12.

Figure 2:
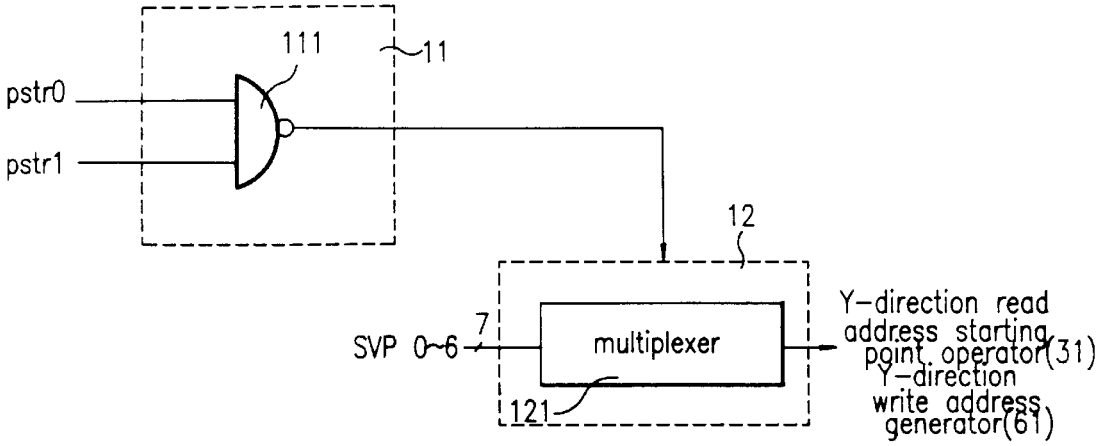
FIG. 2 is a detailed block diagram of the video mode selector and field/frame mode processor of FIG. 1.

Referring to FIG. 2, video mode selector 11 comprises a NAND gate 111 for NAND-operating video mode signal pstr1 or pstr0 and outputting it to field/frame mode processor 12.

If video mode signal pstr1 or pstr0 is "11," the output of NAND gate 111 becomes "0," controlling the video signal to be processed in the frame mode.

If video mode signal pstr1 or pstr0 is "01" or "10," the output of NAND gate 111 becomes "1," controlling the video signal to be processed in the field mode.

Field/frame mode processor 12 comprises a multiplexer 121 for selecting one of slice position signal SVP and a signal double slice position signal SVP according to the signal output from NAND gate 111 of video mode selector 11, as shown in FIG. 2.

If the signal output from NAND gate 111 indicates the frame mode as "0," slice position signal SVP is output from multiplexer 121 without change. If the signal output from NAND gate 111 indicates the field mode as "1," a signal in which slice position signal SVP is shifted upward by one bit, that is, the signal double slice position signal SVP, is output from multiplexer 121.

Multiplexer 121 receives slice position signal SVP and the signal in which slice position signal SVP is shifted by one bit, and selects one according to NAND gate 111.

Figure 3:
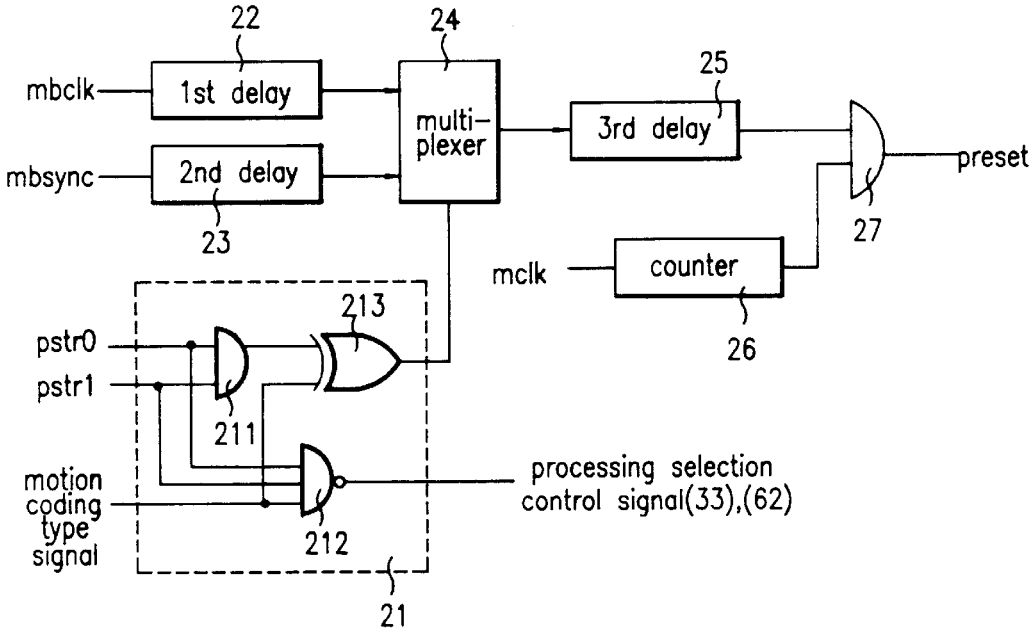
FIG. 3 is a detailed block diagram of the address selection controller of FIG. 1.

Referring to FIG. 3, address selection controller 2 comprises a control signal generator 21 for receiving video mode signal pstr1 or pstr0 and the motion coding type signal, and outputting the processing selection control signal for controlling the selection of modes and another control signal to processed-block unit X-direction read address generator 42 and video mode & motion coding type processing selectors 33 and 62, a first delay 22 for delaying a frame processed-block clock signal mbclk for processing the processed-block in frames in order for synchronization with the processing selection control signal and control signal output from control signal generator 21, a second delay 23 for delaying a field processed-block clock signal mbsync for processing the processed-block in fields in order for synchronization with the processing selection control signal and control signal output from control signal generator 21, a multiplexer 24 for selecting one of the signals output from first and second delays 22 and 23 according to the delay signal of control signal generator 21, a counter 26 for counting to preset the X-direction read address according to main clock mclk, a third delay 25 for delaying the signal output from multiplexer 24 in order for synchronization with the signal output from counter 26, and an AND gate 27 for AND-operating the signal output from third delay 25 and the signal output from counter 26 and outputting a preset signal for presetting the X-direction read address for a predetermined period. Here, counter 26 can lengthen the period of presetting the X-direction read address by using the clear port in case that the half pel is used.

Control signal generator 21 comprises an AND gate 211 for AND-operating video mode signal pstr1 or pstr0, an exclusive-OR gate 213 for EXCLUSIVE-OR-operating the signal output from AND gate 211 and the motion coding type signal to thereby control multiplexer 24, and a NAND gate 212 for NAND-operating video mode signal pstr1 or pstr0 and the motion coding type signal and outputting the processing selection control signal.

Video mode signal pstr1 or pstr0 is AND-operated in AND gate 211, being output as "1" in the frame mode and as "0" in the field mode.

The signal output from AND gate 211 is EXCLUSIVE-OR-operated with the motion coding type signal indicative of the coding type of the processed block, controlling multiplexer 24.

When the signal indicating that the motion coding type signal of the frame mode is processed in fields is output from AND gate 211, the signal is EXCLUSIVE-OR-operated in EXCLUSIVE-OR gate 213 so that multiplexer 24 is controlled to select field processed-block clock signal mbsync delayed in second delay 23.

When the signal indicating that the motion coding type signal of the frame mode is processed in frames is output from AND gate 211, the signal is EXCLUSIVE-OR-operated in EXCLUSIVE-OR gate 213 so that multiplexer 24 is controlled to select frame processed-block clock signal mbclk delayed in first delay 22.

When the signal indicating that the motion coding type signal of the field mode is processed in frames is output from AND gate 211, the signal is EXCLUSIVE-OR-operated in EXCLUSIVE-OR gate 213 so that multiplexer 24 is controlled to select field processed-block clock signal mbsync delayed in second delay 23. The signal output from multiplexer 24 is delayed until the signal of counter 26 is output from third delay 25.

Counter 26 produces a signal for presetting the X-direction read address whenever four main clocks mclk are input which is the number of the pixels divided into four phases in the X direction. In case of the half pel compensation, whenever every five main clock mclk is input, the counter is cleared for one clock and performs counting again, reading nearby pixel data which is then used in compensation.

Figure 4:
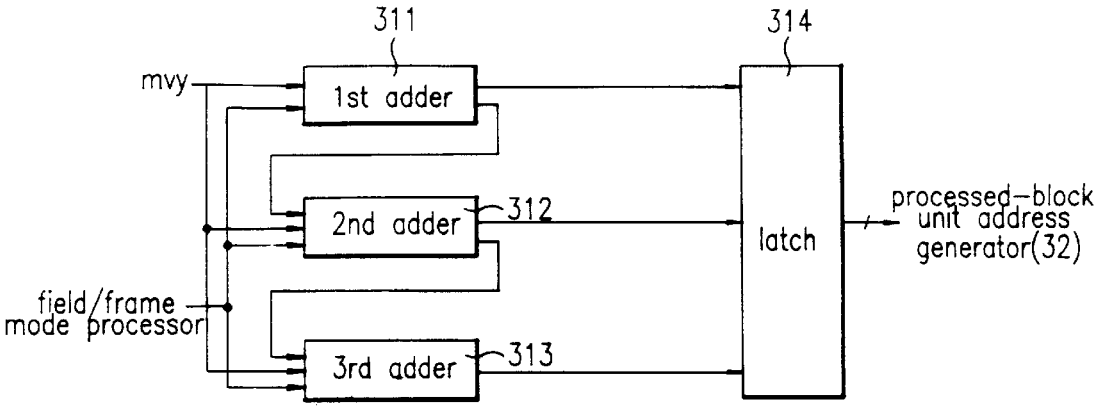
FIG. 4 is a detailed block diagram of the Y-direction read address starting point operator of FIG. 1.

Referring to FIG. 4, Y-direction read address starting point operator 31 comprises first, second and third serially coupled adders 311, 312 and 313 for multiplying the Y-direction size of the processed block to the signal output from field/frame mode processor 12 and adding Y-direction motion vector signal mvy, and a latch 314 for stabilizing the signal output from first, second and third adders 311, 312 and 313.

The signal output from field/frame mode processor 12 and indicative of the Y-direction position of the processed block is multiplied by number 16 which is the Y-direction size of the processed block by first, second and third adders 311, 312 and 313. Y-direction motion vector signal mvy is added to the signal, calculating the starting point where a precisely read Y-direction read address is generated.

The signals output from first, second and third adders 311, 312 and 313 are synchronized and stabilized in latch 314, and output to processed-block unit Y-direction read address generator 32.

Figure 5:
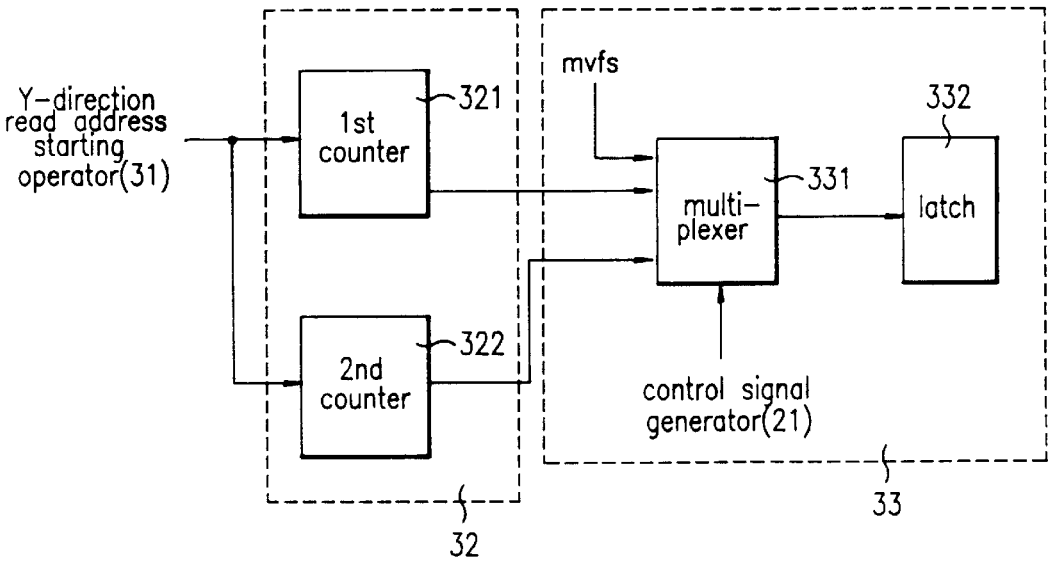
FIG. 5 is a detailed block diagram of the processed-block unit Y-direction read address generator and video mode & motion coding type processing selector of FIG. 1.

Referring to FIG. 5, processed-block unit Y-direction read address generator 32 comprises a first counter 321 for receiving the signal output from latch 314 of Y-direction read address starting point operator 31 and counting to generate the Y-direction read address fit for the frame mode, and a second counter 322 for shifting the signal output from latch 314 and counting to generate the Y-direction read address fit for the field mode.

First and second counters 321 and 322 of processed-block unit Y-direction read address generator 32 generate Y-direction read addresses fit for the frame mode and field mode, respectively.

The signal output from latch 314 of Y-direction read address starting point operator 31 increases by one in first counter 321 whenever four main clocks mclk are generated which is the number of pixels in which the X-direction pixels of the processed block are divided into four phases, producing the Y-direction read address of the frame mode.

The signal output from latch 314 increases by two in second counter 322 whenever four main clocks mclk are generated which is the number of pixels in which the X-direction pixels of the processed block are divided into four phases, producing the Y-direction read address of the field mode.

Referring to FIG. 5, video mode & motion coding type processing selector 33 comprises a multiplexer 331 for selecting the Y-direction read address of one mode of the frame-mode Y-direction read address and field-mode Y-direction read address output from processed-block unit Y-direction read address generator 32 according to address selection controller 2, and if the field-mode Y-direction read address is selected, including vertical field selection signal mvfs into one bit of the lower level, and a latch 332 for stabilizing the signal output from multiplexer 331.

The frame-mode Y-direction read address output from first counter 321 and the field-mode Y-direction read address output from second counter 322 are selected in multiplexer 331 by the processing selection control signal output from control signal generator 21.

Here, when the field-mode Y-direction read address output from second counter 322 is selected, vertical field selection signal mvfs indicative of the upper and lower fields are contained in one bit of the lower level so that the Y-direction read addresses corresponding to the upper and lower fields are output to latch 332.

The Y-direction read address output from multiplexer 331 is synchronized and stabilized in latch 332 and output to Y-direction read & write selector 73 of read & write controller 7.

Figure 6:
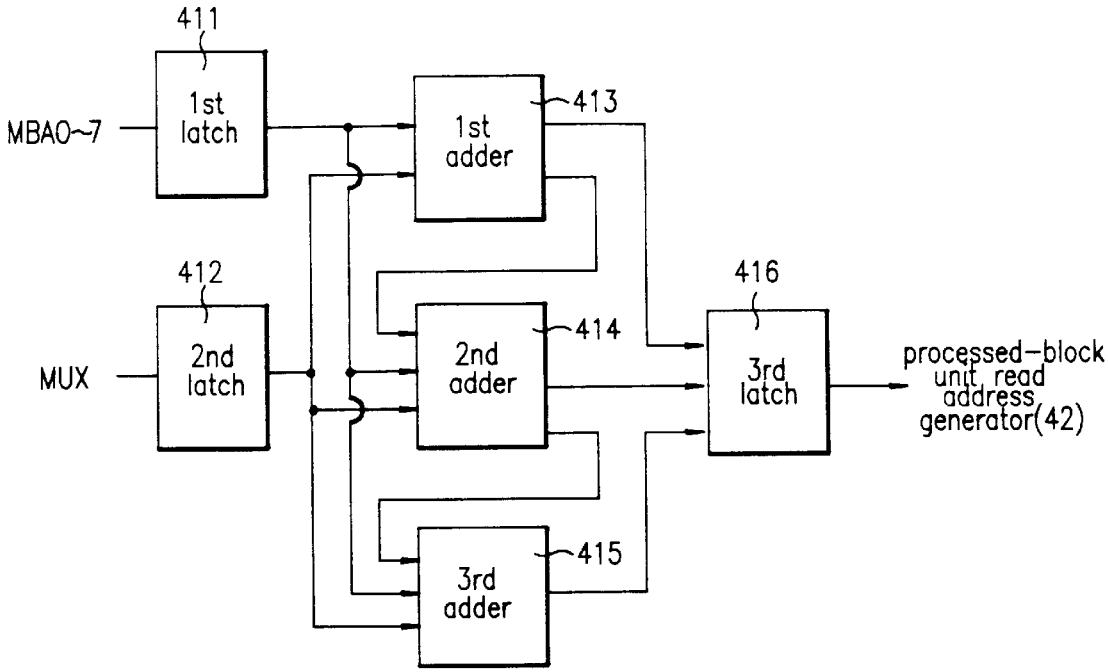
FIG. 6 is a detailed block diagram of the X-direction read address starting point operator of FIG. 1.

Referring to FIG. 6, X-direction read address starting point operator 41 comprises first and second latches 411 and 412 for latching processed-block position signal MBA and X-direction motion vector signal mvx for the purpose of synchronization, first, second and third serially coupled adders 413, 414 and 415 for multiplying the X-direction size of the processed block unit to the signal output from first latch 411 and adding the signal output from second latch 412, and a third latch 416 for stabilizing the signal output from first, second and third adders 413,414 and 415.

The input time points of processed-block position signal MBA and X-direction motion vector signal mvx may be different. Therefore, their time points are made to coincide in first and second latches 411 and 412, respectively. The signals are multiplied by number 16 which is the X-direction size of the processed block by first, second and third adders 413,414 and 415. X-direction motion vector signal mvx is added to the signals, calculating the starting point where a precisely read X-direction read address is generated.

The signals output from first, second and third adders 413, 414 and 415 are synchronized and stabilized in third latch 416, and output to processed-block unit X-direction read address generator 42.

Figure 7:
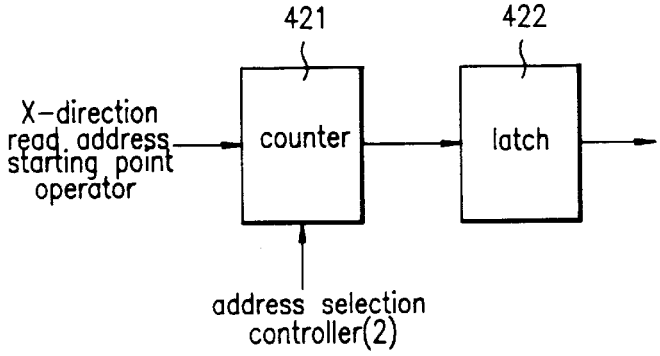
FIG. 7 is a detailed block diagram of the processed-block unit X-direction read address generator of FIG. 1.

Referring to FIG. 7, processed-block unit X-direction read address generator 42 comprises a counter 421 for receiving the signal output from third latch 416 of X-direction read address starting point operator 41, being preset according to a preset signal output from address selection controller 2, dividing the processed block in four phases in the X direction and counting to generate the X-direction read address, and a latch 422 for stabilizing the signal output from counter 421.

Here, in case of the half pel, counter 421 may be preset for a period in which the value in which the processed block is divided into four phases in the X direction, that is, number 4, is added by one by counter 26 of address selection controller 2.

The signal corresponding to the starting point of the X-direction read address of the processed block to read, that is, the signal output from third latch 416 of X-direction read address starting point operator 41, is input to counter 421 and increases by one whenever main clock mclk is produced. When the main clock is input as many as the pixels in which the processed block is divided into four phases in the X direction or the number in which one is added to the number of the pixels, the signal is preset according to the preset signal output from address selection controller 2. The signal increases again by one whenever main clock mclk is produced. This process is repeated until one processed block all is read.

The signal output from counter 421 is synchronized and stabilized in latch 422, and input to four-phase address generator 71 of read & write controller 7.

Figure 8:
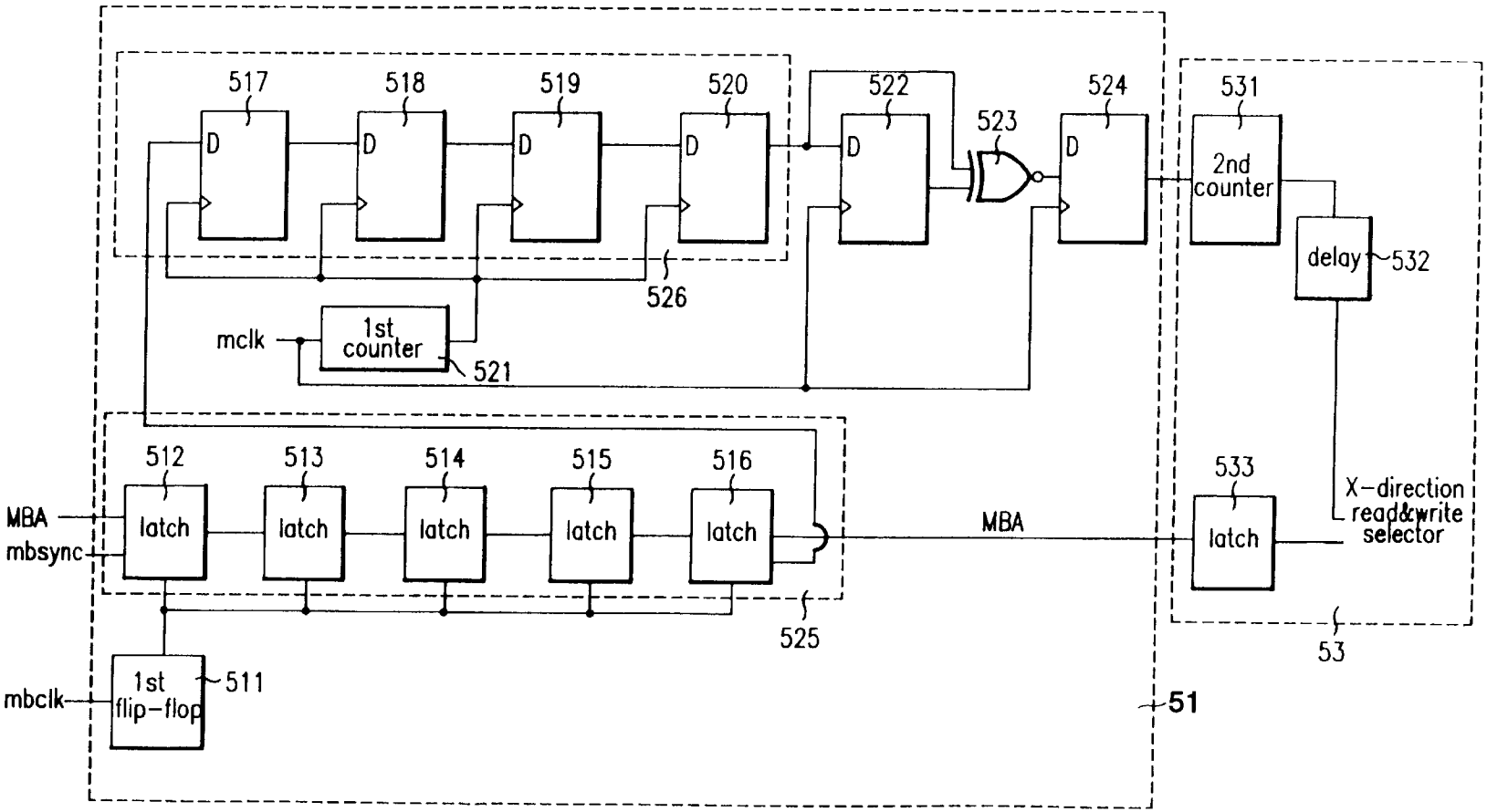
FIG. 8 is a detailed block diagram of the processed-block unit X-direction write address generator of FIG. 1.

Referring to FIG. 8, X-direction write address delay controller 51 comprises a first D flipflop 511 for receiving frame processed-block clock signal mbclk for processing the processed block in frames and outputting a clock signal, a latch portion 525 having a plurality of serially coupled latches 512, 513, 514, 515, and 516 for receiving the signal output from first D flipflop 511 as a clock input and delaying processed block clock signal mbsync for processing the processed block in fields and processed-block position signal MBA for a predetermined time, a first counter 521 for receiving main clock signal mclk and performing counting, a D flipflop portion 526 having a plurality of serially coupled flipflops 517, 518, 519, and 520 for receiving the signal output from first counter 521 as a clock input and delaying field processed-block clock signal delayed and output from latch portion 525 for a predetermined time, a second D flipflop 522 for receiving main clock signal mclk as a clock input and receiving the field processed-block clock signal mbsync delayed and output from D flipflop portion 526 as data input, an EXCLUSIVE-NOR gate 523 for EXCLUSIVE-NOR-operating the data input signal and output signal of second D flipflop 522, and a third D flipflop 524 for receiving the signal output from EXCLUSIVE-NOR gate 523 as data input and receiving main clock signal mclk as the clock input.

Frame processed-block clock signal mbclk is input to the clear port of latches 512, 513, 514, 515 and 516 of latch portion 525 via first D flipflop 511, delaying processed-block position signal MBA and field processed-block clock signal mbsync.

Here, processed-block position signal MBA and field processed-block clock signal mbsync are delayed while frame processed-block clock signal mbclk is input by latches 513, 514, 515 and 516, that is, while 64 main clocks are input.

Since latches 513,514, 515 and 516 delay processed-block position signal MBA and field processed-block clock signal mbsync while the 64 main clocks are input, the overall delay time of latches 513, 514, 515 and 516 becomes the time to generate 64-by-4 main clocks.

Processed-block position signal MBA delayed through latch portion 525 is input to X-direction write address generator 53. Field processed-block clock signal mbsync is input to D flipflop portions 526 and delayed for a time where the 64 main clocks are not input.

The output signal of first counter 521 increases by one whenever 16 main clocks mclk are generated, is input to the clock input port of D flipflops 517, 518, 519 and 520 of D flipflop portion 526, and delayed while 16 main clocks are input.

D flipflops 518, 519 and 520 delay the output signal of first counter 521 while the 16 main clocks are input, the total delay time of D flipflops 518, 519 and 520 becomes the time to generate 16-by-3 main clocks.

Field processed-block clock signal mbsync delayed in D flipflop portion 526 and output from D flipflop 520 is input to second D flipflop 522 to be EXCLUSIVE-NOR-operated with field processed-block clock signal mbsync delayed and output until main clock mclk is input. Then, a preset signal is generated to preset the counter in units of processed block and make the output of the counter as "0." The preset signal is delayed via third D flipflop 524 by main clock mclk, and output to X-direction write address generator 53.

Referring to FIG. 8, X-direction write address generator 53 comprises a second counter 531 for counting only two bits by taking the signal output from third D flipflop 524 of X-direction write address delay controller 51 as the reset signal, a latch 533 for temporarily storing and stabilizing processed-block position signal MBA delayed and output from latch portion 525, and a delay 532 for delaying the signal output from second counter 531 for the purpose of synchronization.

The signal output from third D flipflop 524 resets second counter 531 whenever four main clocks mclk are produced. Second counter 531 counts only the two bits of the lower level of the output signal of third D flipflop 524. The output of the counter is synchronized through delay 532 and becomes the X-direction write address along with processed-block position signal MBA output from latch portion 525. The address is output to X-direction read & write selector 72 of read & write controller 7.

Here, second counter 531 counts only the two bits of the lower level of the output signal of third D flipflop 524 in case that the processed block is the 16-by-16 block. In this case, a signal divided into four pixels and indicative of four pixels may be output. Therefore, only the two bits of the lower level are varied sequentially and reset.

Figure 9:
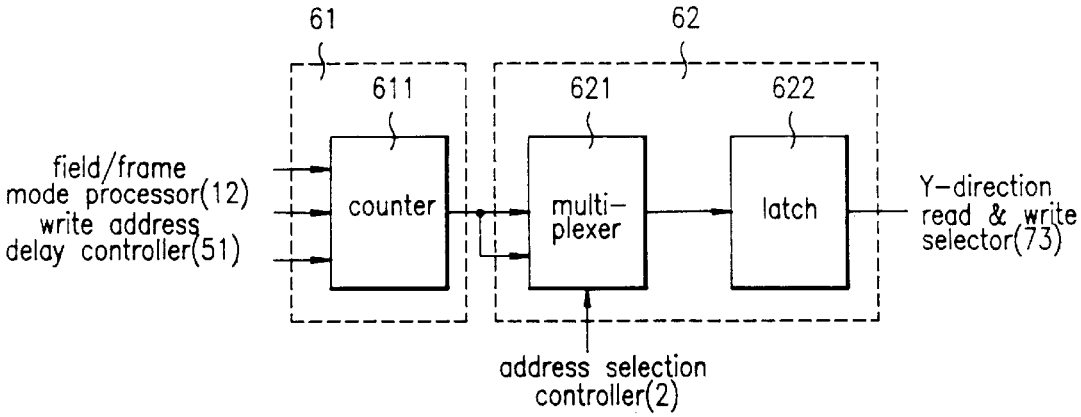
FIG. 9 is detailed block diagram of the Y-direction write address generator of FIG. 1.

Referring to FIG. 9, Y-direction write address generator 61 comprises a counter 611 preset according to the signal output from X-direction write address delay controller 51 and for multiplying the Y-direction size of the processed-block unit to the signal output from field/frame mode processor 12 of mode selector 1, and counting periodically according to main clock signal mclk. Counter 611 counts whenever the X-direction write addresses divided into four phases by main clock mclk are all generated and preset.

Counter 611 uses only the higher bits of the output signal excluding the two bits of the lower level, not using the two bits of the lower level.

When the signal is output from third D flipflop 524 of X-direction write address delay controller 51, counter starts operating so that the signal output from field/frame mode processor 12 increases by one or two, generating the Y-direction write address.

Here, in order to increase the signal output from field/frame mode processor 12 of mode selector 1 by two, counter 611 shifts one bit of the lower level which is then output to video mode & motion coding type processing selector 62.

Referring to FIG. 9, video mode & motion coding type processing selector 62 comprises a multiplexer 621 for selecting one of the output signal of counter 611 and the shifted output signal of counter 611 according to address selection controller 2, and a latch 622 for stabilizing the signal output from multiplexer 621.

The frame-mode Y-direction write address in which one bit of the lower level is not shifted and the field-mode Y-direction read address in which one bit of the lower level is shifted are selected in multiplexer 621 according to the processing selection control signal output from control signal generator 21.

The Y-direction write address output from multiplexer 621 is synchronized and stabilized in latch 622, and output to Y-direction read & write selector 73 of read & write controller 7.

Figure 10:
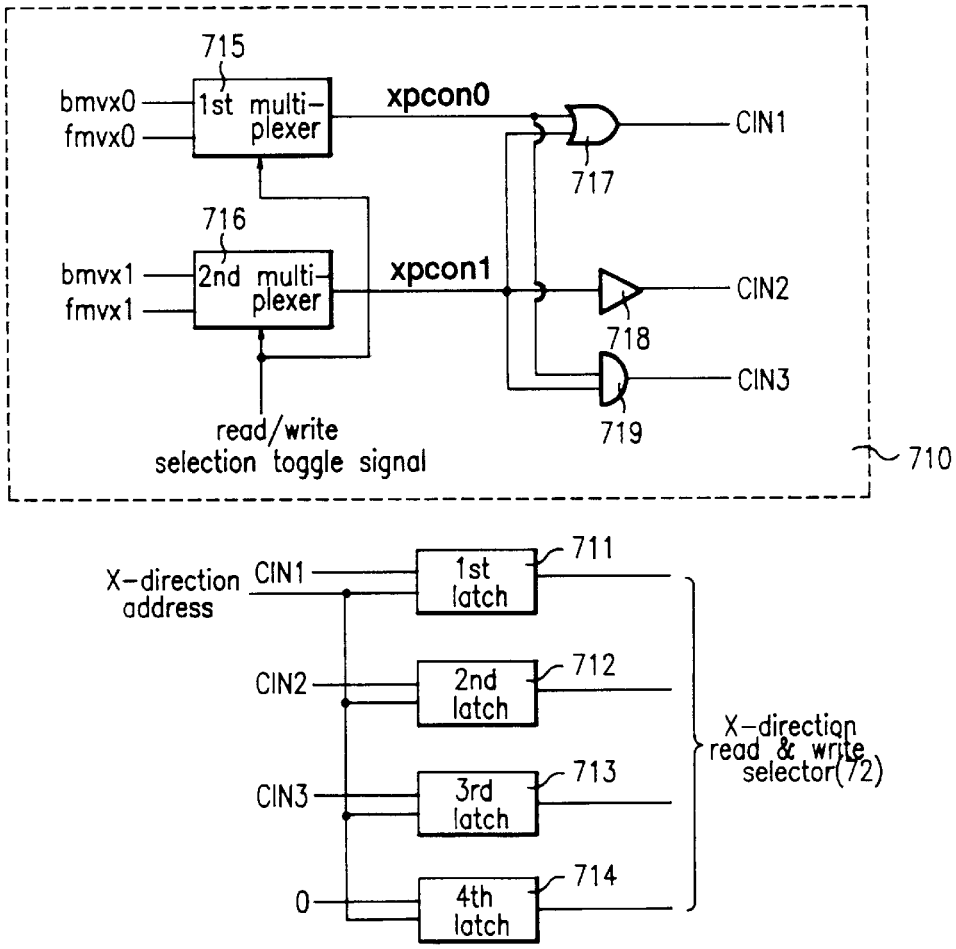
FIG. 10 is a detailed block diagram of the four-phase address generator of FIG. 1.

Referring to FIG. 10, four-phase address generator 71 comprises a compensation controller 710 for controlling the compensation of the X-direction read address divided into four phases by using the read/write selection toggle signal and the two bit signals bmvx0,1 and fmvx0,1 of the lower level of the X-direction motion vector signal of the backward and forward frames, first, second and third latches 711, 712 and 713 for latching the X-direction read address output from processed-block unit X-direction read address generator 42 of X-direction read address generator 4 according to compensation controller 710, and a fourth latch 714 for latching the X-direction read address output from processed-block unit X-direction read address generator 42 of X-direction read address generator 4 according to the low-level signal 0. The four-phase address generator produces the X-direction read address divided into four phases.

Compensation controller 710 comprises a first multiplexer 715 for selecting one of the lowest bit signals bmvx0 and fmvx0 of the X-direction motion vector signal of the backward and forward frames according to the read/write selection toggle signal, a second multiplexer 716 for selecting one of the second lowest bit signals bmvx1 and fmvx1 of the X-direction motion vector signal of the backward and forward frames according to the read/write selection toggle signal, an OR gate 717 for OR-operating the signals output from first and second multiplexers 715 and 716 and outputting a signal CIN1 for controlling first latch 711, a buffer 718 for delaying the signal output from second multiplexer 716 and outputting a signal CIN2 for controlling second latch 712, and an AND gate 719 for OR-operating the signals output from first and second multiplexers 715 and 716 and outputting a signal CIN3 for controlling third latch 713.

The read/write selection toggle signal for changing the memory for storing the video signal data allows first and second multiplexers 715 and 716 to select one of the two bit signals bmvx0,1 and fmvx0,1 of the lower level of the X-direction motion vector signal of the backward and forward frames.

Signals xpcon 0,1 selected and output from first and second multiplexers 715 and 716 are to control the X-direction address by dividing it into four phases. They are OR-operated in OR gate 717 to control first latch 711. Signal xpcon 1 output from second multiplexer 716 is delayed and synchronized in buffer 718 to control second latch 712. Signals xpcon 0,1 output from first and second multiplexers 715 and 716 are AND-operated in AND gate 719 to control third latch 713.

In case that the X-direction read address is divided by 4 and its remainder is 3, first, fourth latch 714 generates the X-direction read address, and then high-level signals are output from OR gate 717, buffer 718 and AND gate 719 so that the X-direction read addresses are generated#sequentially.

In case that the X-direction read address is divided by 4 and its remainder is 0, low-level signals are output from 0R gate 717, buffer 718 and AND gate 719 so that the X-direction read addresses are generated simultaneously in first, second, third and fourth latches 711, 712,713 and 714.

In case that the X-direction read address is divided by 4 and its remainder is 1, first, second, third and fourth latches 712, 713 and 714 generate the X-direction read address, and then low-level signals are output from buffer 718 and AND gate 719 so that the X-direction read addresses are generated sequentially.

In case that the X-direction read address is divided by 4 and its remainder is 2, first, third and fourth latches 713 and 714 generate the X-direction read address, and then low-level signals are output from AND gate 719 so that the X-direction read addresses are generated sequentially.

The four-phase X-direction read addresses output from first, second third and fourth latches 711, 712, 713 and 714 are output to X-direction read & write selector 72 of read & write controller 7.

Figure 11:
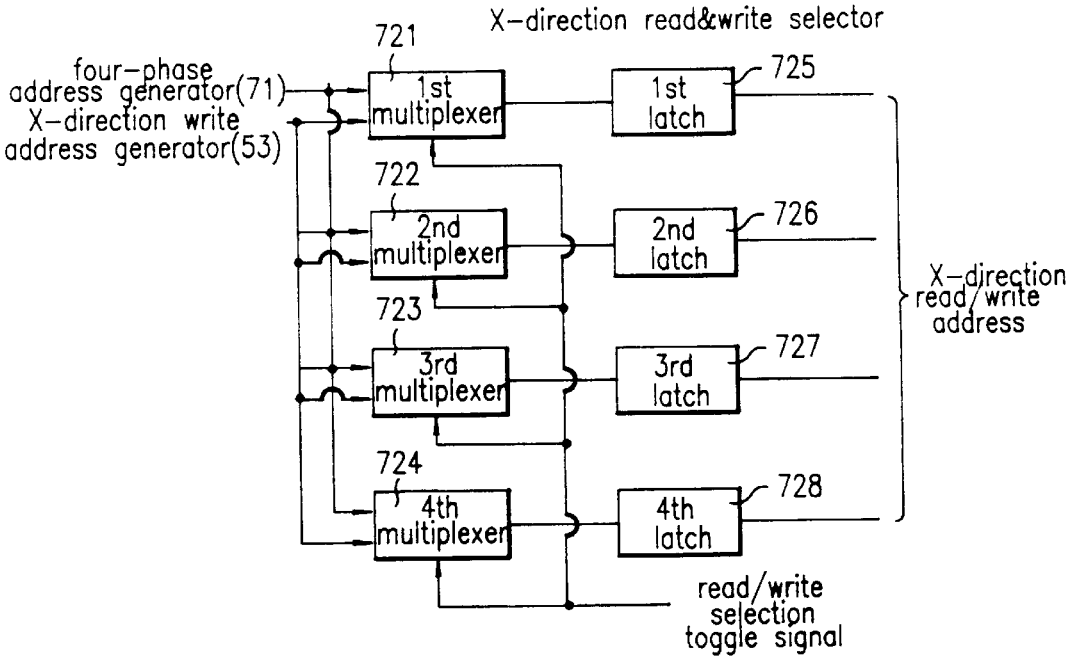
FIG. 11 is a detailed block diagram of the X-direction read & write selector of FIG. 1.

Referring to FIG. 11, X-direction read & write selector 72 comprises first, second, third and fourth multiplexers 721, 722, 723 and 724 for selecting one of the X-direction read address and X-direction write address output from four-phase address generator 71 and X-direction write address generator 53 according to read/write selection toggle signal, and first, second, third and fourth latches 725, 726, 727 and 728 for stabilizing the X-direction read address and X-direction write address output from multiplexers 721, 722, 723 and 724.

In case that the read/write selection toggle signal indicates a reading mode, first, second, third and fourth multiplexers 721, 722, 723 and 724 select the four-phase X-direction read addresses output from four-phase address generator 71.

In case that the read/write selection toggle signal indicates a writing mode, first, second, third and fourth multiplexers 721, 722, 723 and 724 select the X-direction write addresses output from X-direction write address generator 53.

The X-direction read address and X-direction write address selected by first, second, third and fourth multiplexers 721, 722, 723 and 724 are stabilized in first, second, third and fourth latches 725, 726, 727 and 728.

Figure 12:
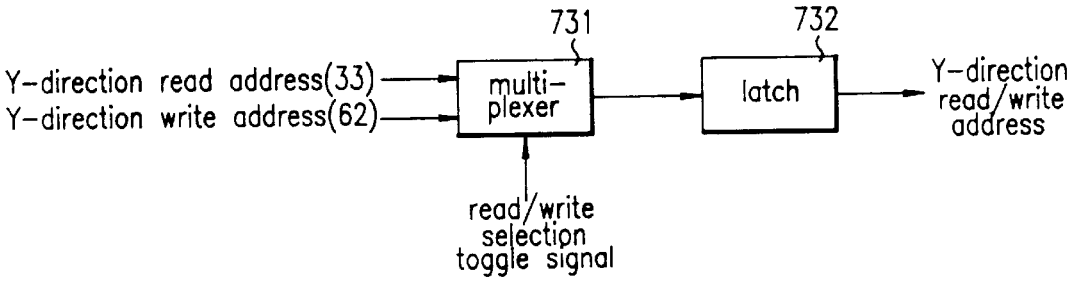
FIG. 12 is a detailed block diagram of the Y-direction read & write selector of FIG. 1.

Referring to FIG. 12, Y-direction read & write selector 73 comprises a multiplexer 731 for selecting one of the Y-direction read address and Y-direction write address output from video mode & coding type processing selectors 33 and 62 of Y-direction read address generator 3 and Y-direction write address generator 6 according to the read/write selection toggle signal, and a latch 732 for stabilizing the Y-direction read address and Y-direction write address output from multiplexer 731.

In case that the read/write selection toggle signal indicates a reading mode, multiplexer 731 selects the Y-direction read addresses output from video mode & motion coding type processing selector 33 of Y-direction read address generator 3. In case that the read/write selection toggle signal indicates a writing mode, multiplexer 731 selects the Y-direction write addresses output from video mode & motion coding type processing selector 62 of Y-direction write address generator 6.

The Y-direction read address and Y-direction write address selected by multiplexer 731 are stabilized in latch 732.

As described above, the present invention implements the high level of the main profile of the MPEG II algorithm with hardware, allowing the MPEG II algorithm to be employed in HDTVs or HDVCRs.

Since the standard of a digital high-definition television (HDTV) which is highly marketable in US and the like follows the high level of the main profile of the MPEG II algorithm, the present invention allows this algorithm to be implemented in a stabler and more commercially useful designing method, fostering the development of HDTVs and HDVCRs.

What is claimed is:

1. An image motion compensating address generator *for a generating addresses of a memory,* comprising:

mode selector means for selecting a field mode or frame mode according to a video mode signal indicative of whether an input video signal is a frame unit or field unit and a slice position signal indicative of the position of *a* slice, to thereby control the video signal to be processed;

address selection controller means for controlling the generation of *the* addresses according to the video mode signal and a motion coding type signal indicative of the video processing mode of a block to be processed;

[Y-direction read] address generator means for producing [a Y-direction read address] *the addresses* in units of processed block by using the signal output from the mode selector means [according to] *and* the address selection controller means[, a Y-direction motion vector signal, and a vertical field selection signal;

X-direction read address generator means for dividing the processed block into four phases in the X direction and generating an X-direction read address by using a processed-block position signal indicative of the position of the processed block and an X-direction motion vector signal according to the address selection controller means;

X-direction write address generator means for delaying the processed-block position signal and a field processed-block clock signal, and generating the X-direction write address of four phases, to thereby write read-out video data;

Y-direction write address generator means for producing a Y-direction write address by using the signal output from of the mode selector means according to the address selection controller means and the X-direction write address generator means, to thereby write read-out video data]; and

[read & write] controller means for selectively outputting the [X-direction and Y-direction read and write] addresses according to a read/write selection toggle signal and [an X-direction] *a* motion vector signal among the [X-direction and Y-direction read and write] addresses output from the [Y-direction read] address generator means[, X-direction read address generator means, X-direction write address generator means and Y-direction write address generator means].

2. [An] *The* image motion compensating address generator as claimed in claim 1, wherein the mode selector means comprises:

a video mode selector for determining whether an address is generated in a field mode or frame mode according to the video mode signal; and a field/frame mode processor for establishing the position of *the* slice in the field mode and frame mode according to the signal output from the video mode selector means and the slice position signal.

3. [An] *The* image motion compensating address generator as claimed in claim 2, wherein the video mode selector comprises a NAND gate for NAND-operating the video mode signal and outputting it to the field/frame mode processor.

4. [An] *The* image motion compensating address generator as claimed in claim 2, wherein the field/frame mode processor comprises a multiplexer for selecting one of the slice position signal and a signal double the slice position signal according to the signal output from [a NAND gate of] the video mode selector.

5. [An] *The* image motion compensating address generator as claimed in claim 1, wherein the address selection controller means comprises:

a control signal generator for receiving the video mode signal and the motion coding type signal, and outputting a processing selection control signal for controlling the selection of modes and [another] *a* control signal to the [Y-direction read] address generator means[, X-direction read address generator means and Y-direction write address generator means];

a first delay for delaying a frame processed-block clock signal for processing the processed-block in frames in order for synchronization with the processing selection control signal and control signal output from the control signal generator;

a second delay for delaying a field processed-block clock signal for processing the processed-block in fields in order for synchronization with the processing selection control signal and control signal output from the control signal generator;

a multiplexer for selecting one of the signals output from the first and second delays according to the delay signal of the control signal generator;

a counter for counting to preset [the X-direction read] *an* address according to an input main clock;

a third delay for delaying the signal output from the multiplexer [24] in order for synchronization with the signal output from the counter; and an AND gate for AND-operating the signal output from the third delay and the signal output from the counter and outputting a preset signal for presetting the [X-direction read] address.

6. [An] *The* image motion compensating address generator as claimed in claim 5, wherein the control signal generator comprises:

an AND gate for AND-operating the video mode signal;

an exclusive-OR gate for EXCLUSIVE-OR-operating the signal output from the AND gate and the motion coding type signal to thereby control the multiplexer; and a NAND gate for NAND-operating the video mode signal and the motion coding type signal and outputting a processing selection control signal.

7. [An] *The* image motion compensating address generator as claimed in claim 5, wherein the counter varies the period of presetting the [X-direction read] address by using a clear port in case that a half pel is used.

8. [An] *The* image motion compensating address generator as claimed in claim [1] *29*, wherein the [Y-direction] *first* read address generator means comprises:

a [Y-direction] read address starting point operator for operating [the Y-direction] *a first* starting point of a processed block to *be* read, according to the signal output from the field/frame mode processor of the mode selector means and [a Y-direction] *the first direction* motion vector signal;

a processed-block unit [Y-direction] read address generator for generating [Y-direction] *the first direction* read addresses of several modes so that the signal output from the [Y-direction] read address starting point operator coincides with the processed block; and a video mode [&] *and* motion coding type processing selector for receiving a signal output from the processed-block unit [Y-direction] read address generator and [a vertical] *the first* field selection signal according to the address selection controller means, to thereby outputting [a Y-direction] *the first direction* read address fit for the respective modes.

9. [An] *The* image motion compensating address generator as claimed in claim 8, wherein the [Y-direction] read address starting point operator comprises:

first, second and third serially coupled adders for multiplying [the Y-direction] *a first direction* size of the processed block to the signal output from the field/frame mode processor of the mode selector means and adding [a Y-direction] *the first direction* motion vector signal; and a latch for stabilizing the signals output from the first, second and third adders.

10. [An] *The* image motion compensating address generator as claimed in claim 8, wherein the processed-block unit [Y-direction] read address generator comprises:

a first counter for receiving the signal output from the latch of the [Y-direction] read address starting point operator and counting to generate the [Y-direction] *first direction* read address fit for the frame mode; and a second counter for shifting the signal output from the latch of the [Y-direction] read address starting point operator, and counting to generate the [Y-direction] *first direction* read address fit for the field mode.

11. [An] *The* image motion compensating address generator as claimed in claim 8, wherein the video mode [&] *and* motion coding type processing selector comprises:

a multiplexer for selecting the [Y-direction] *first direction* read address of one mode of frame-mode [Y-direction] *first direction* read address and field-mode [Y-direction] *first direction* read address output from the processed-block unit [Y-direction] read address generator according to the address selection controller means, and if the field-mode [Y-direction] *first direction* read address is selected, including [a vertical] *the first* field selection signal into one bit of the lower level; and a latch for stabilizing the signal output from the multiplexer.

12. [An] *The* image motion compensating address generator as claimed in claim [1] *30*, wherein the [X-direction] *second* read address generator means comprises:

[an X-direction] *a* read address starting point operator for operating [the X-direction] *a second direction* starting point of the processed block to read by using [a] *the* processed-block position signal and [an X-direction] *the second direction* motion vector signal; and a processed-block unit [X-direction] read address generator for receiving the signal output from the [X-direction] read address starting point operator according to the address selection controller means, dividing the processed block into four phases and generating the [X-direction] *second direction* read address.

13. [An] *The* image motion compensating address generator as claimed in claim 12, wherein the [X-direction] read address starting point operator comprises:

a first latch for latching the processed-block position signal for the purpose of synchronization;

a second latch for latching the [X-direction] *second direction* motion vector signal for the purpose of synchronization;

first, second and third serially coupled adders for multiplying [the X-direction] *a second direction* size of the processed block unit to the signal output from the first latch and adding the signal output from the second latch; and a third latch for stabilizing the signal output from the first, second, and third adders.

14. [An] *The* image motion compensating address generator as claimed in claim 12, wherein the processed-block unit [X-direction] read address generator comprises:

a counter for receiving the signal output from the third latch of the [X-direction] read address starting point operator, being preset according to a preset signal output from the address selection controller means, dividing the processed block in four phases in the [X direction] *second direction* and counting to generate the [X-direction] *second direction* read address; and a latch for stabilizing the signal output from the counter.

15. [An] *The* image motion compensating address generator as claimed in claim 14, wherein the counter is preset for a period in which a value in which the processed block is divided into four phases in the [X direction] *second direction*, is added by one in case of half pel.

16. An image motion compensating address generator as claimed in claim [1] *30*, wherein the [X-direction] *second* write address generator means comprises:

[an X-direction] *a* write address delay controller for delaying the processed-block position signal and field processed-block clock signal for a predetermined time [so as to rewrite read-out video data]; and

[an X-direction] *a* write address generator for dividing the processed block into four phases and generating the [X-direction] *second direction* write address by using the signal output from the [X-direction] write address delay controller.

17. [An] *The* image motion compensating address generator as claimed in claim 16, wherein the [X-direction] write address delay controller comprises:

a first D flipflop for receiving a frame processed-block clock signal for processing the processed block in frames and outputting a clock signal;

a latch portion having a plurality of serially coupled latches for receiving the signal output from the first D flipflop as a clock input and delaying the processed block clock signal for processing the processed block in fields and the processed-block position signal for a predetermined time;

a first counter for receiving a main clock signal and performing counting;

a D flipflop portion having a plurality of serially coupled flipflops for receiving the signal output from the first counter as a clock input and delaying the field processed-block clock signal delayed and output from the latch portion for a predetermined time;

a second D flipflop for receiving the main clock signal as a clock input and receiving the field processed-block clock signal delayed and output from the D flipflop portion as data input;

an EXCLUSIVE-NOR gate for EXCLUSIVE-NOR-operating the data input signal and output signal of the second D flipflop; and a third D flipflop for receiving the signal output from the EXCLUSIVE-NOR gate as data input and receiving the main clock signal as the clock input.

18. [An] *The* image motion compensating address generator as claimed in claim 16, wherein the [X-direction] write address generator comprises:

a second counter for counting only two bits by taking the signal output from the third D flipflop of the [X-direction] write address delay controller as the reset signal;

a latch for temporarily storing and stabilizing the processed-block position signal delayed and output from the latch portion; and a delay for delaying the signal output from the second counter for the purpose of synchronization.

19. An image motion compensating address generator as claimed in claim [1] *30*, wherein the [Y-direction] *first* write address generator means comprises:

a [Y-direction] write address generator for generating [a Y-direction] *the first direction* write address in units of processed block by using the signal output from a field/frame mode processor of the mode selector means [according to an X-direction write address delay controller of the X-direction write address generator means] *and the delayed processed-block position signal*; and a video mode [&] *and* motion coding type processing selector for selectively outputting the [Y-direction] *first direction* write address fit for the respective modes among the signals output from the [Y-direction] write address generator according to the address selection controller means.

20. An image motion compensating address generator as claimed in claim [19] *21*, wherein the video mode [&] *and* motion coding type processing selector comprises:

a multiplexer for selecting one of the output signal of the counter and the shifted output signal of the counter according to the address selection controller means; and a latch for stabilizing the signal output from the multiplexer.

21. [An] *The* image motion compensating address generator as claimed in claim 19, wherein the [Y-direction] write address generator comprises:

a counter preset according to the [signal output from the X-direction write address delay controller] *delayed processed-block position signal* and for multiplying the [Y-direction] *first direction* size of the processed-block unit to the signal output from the field/frame mode processor of the mode selector means, and counting periodically according to the main clock signal.

22. [An] *The* image motion compensating address generator as claimed in claim 21, wherein the counter counts whenever the [X-direction] *second direction* write addresses divided into four phases by the main clock are all generated and preset.

23. [An] *The* image motion compensating address generator as claimed in claim 22, wherein the counter uses only the higher bits of an output signal excluding the two bits of the lower level, not using the two bits of the lower level.

24. [An] *The* image motion compensating address generator as claimed in claim [1] *30*, wherein the [read & write] controller means comprises:

a [Y-direction read & write] *first* selector for selectively outputting one of the [Y-direction] *first direction* read address and [Y-direction] *first direction* write address output from the [Y-direction] *first* read address generator means and [Y-direction] *first* write address generator means according to the read/write selection toggle signal;

a four-phase address generator for compensating for the [X-direction] *second direction* read address output from the [X-direction] *second* read address generator means according to the read/write selection toggle signal; and

[an X-direction read & write] *a second* selector for selecting one of the [X-direction] *second direction* read address and [X-direction] *second direction* write address output from the four-phase address generator and [X-direction] *second* write address generator means and dividely outputting the selected address in four phases according to the read/write selection toggle signal.

25. [An] *The* image motion compensating address generator as claimed in claim 24, wherein the [X-direction read & write] *second* selector comprises:

first, second, third and fourth multiplexers for selecting one of the [X-direction] *second direction* read address and [X-direction] *second direction* write address output from the four-phase address generator and [X-direction] *second* write address generator means according to the read/write selection toggle signal; and first, second, third and fourth latches for stabilizing the [X-direction] *second direction* read address and [X-direction] *second direction* write address output from the first, second, third and fourth multiplexers.

26. An image motion compensating address generator as claimed in claim 24, wherein the [Y-direction read & write] *first* selector comprises:

a multiplexer for selecting one of the [Y-direction] *first direction* read address and [Y-direction] *first direction* write address output from the [Y-direction] *first* read address generator means and [Y-direction] *first* write address generator means according to the read/write selection toggle signal; and a latch for stabilizing the [Y-direction] *first direction* read address and [Y-direction] *first direction* write address output from the multiplexer.

27. An image motion compensating address generator as claimed in claim 24, wherein the four-phase address generator comprises:

a compensation controller for controlling the compensation of the [X-direction] *second direction* read address divided into four phases by using the read/write selection toggle signal and two bit signals of the lower level of the [X-direction] *second direction* motion vector signal of the backward and forward frames;

first, second and third latches for latching the [X-direction] *second direction* read address output from the [processed-block unit X-direction read address generator of the X-direction] *second* read address generator means according to the compensation controller; and a fourth latch for latching the [X-direction] *second direction* read address output from the [processed-block unit X-direction read address generator of the X-direction] *second direction* read address generator means according to al ow-level signal.

28. [An] *The* image motion compensating address generator as claimed in claim 27, wherein the compensation controller comprises:

a first multiplexer for selecting one of the lowest bit signals of the [X-direction] *second direction* motion vector signal of the backward and forward frames according to the read/write selection toggle signal;

a second multiplexer for selecting one of the second lowest bit signals of the [X-direction] *second direction* motion vector signal of the backward and forward frames according to the read/write selection toggle signal;

an OR gate for OR-operating the signals output from the first and second multiplexers and outputting a signal for controlling the first latch;

a buffer for delaying the signal output from the second multiplexer and outputting a signal for controlling the second latch; and an AND gate for OR-operating the signals output from the first and second multiplexers and outputting a signal for controlling the third latch.

*29. The image motion compensating address generator as claimed in claim 1, wherein said address generator means comprises:*

*a first read address generator means for producing a first direction read address in units of the processed block by using the signal output from the mode selector means according to the address selection controller means, a first direction motion vector signal, and a first field selection signal; and*

*a first write address generator means for producing a first direction write address by using the signal output from of the mode selector means according to the address selection controller means.*

*30. The image motion compensating address generator as claimed in claim 29, wherein said address generator means further comprises:*

*a second read address generator means for dividing the processed block into four phases in a second direction and generating a second direction read address by using a processed-block position signal indicative of the position of the processed block and a second direction motion vector signal and coupled to the address selection controller means; and*

*a second write address generator means for delaying the processed-block position signal, which is provided to said first write address generator means, and a field processed-block clock signal, and generating a second direction write address of four phases.*

*31. A controller for an image motion compensating address generator to generate addresses of a memory, comprising:*

*a selector that selects one of a field unit and a frame unit according to a video mode signal indicative of whether an input video signal is one of a frame unit and a field unit and a slice position signal indicative of a position of a slice; and*

*an address controller that controls a generation of addresses according to the video mode signal and a motion coding signal indicative of the video processing mode.*

*32. The controller of claim 31, wherein the video mode signal comprises first and second bits and each bit has a binary value, the video mode signal being indicative of the frame unit when the first and second bits have a same binary value and the video mode signal being indicative of the field unit when the first and second bits have different binary values.*

*33. The controller of claim 32, wherein the first and second bits have binary values of "1" and "1", respectively, for the frame unit.*

*34. The controller of claim 32, wherein the first and second bits have one of binary values of "1" and "0" and binary values of "0" and "1" for the field unit.*

*35. The controller of claim 34, wherein the binary values of "1" and "0" are indicative of a lower field during the field unit, and the binary values of "0" and "1" are indicative of an upper field during the field unit.*

*36. The controller of claim 32, wherein the motion coding type signal is indicative of field base mode or frame base mode when the first and second bits are indicative of the frame unit, or is indicative of field base mode or N-by-M base mode when the first and second bits are indicative of the field unit, where N and M are integers greater than zero.*

*37. The controller of claim 36, wherein N and M are 16 and 8, respectively.*

*38. The controller of claim 36, wherein during the frame unit, the motion coding type signal has a value of "01" for the field base mode and a value of "10" for the frame base mode.*

*39. The controller of claim 35, wherein during the field unit, the motion coding type signal has a value of "01" for the field base mode, and the motion coding type signal has a value of "10" for the N-by-M base mode.*

*40. The controller of claim 31, wherein said selector comprises:*

*a logic gate for performing a first logical operation on the video mode signal; and*

*a multiplexer coupled for receiving an output of said logic gate and the slice position signal and outputting a prescribed multiple of the slice position signal based on whether the output of said logic gate indicates one of field unit and frame unit.*

*41. The controller of claim 40, wherein the slice position signal is provided as the output when the output of said logic gates indicates the frame unit, and the prescribed multiple is two when the output of said logic gate indicates the field unit.*

*42. The controller of claim 36, wherein said address controller comprises:*

*a control circuit coupled for receiving the video mode signal and motion coding type signal such that said control signal outputs (1) a first control signal indicative of the field base mode during the frame unit, the frame base mode during the frame unit, field base mode during the field unit, or N-by-M base mode during the field unit, and (2) a second control signal for controlling the image motion compensating address generator;*

*a multiplexer coupled for receiving a first clock signal for synchronization during the frame unit and a second*

*clock signal for synchronization during the frame unit, said multiplexer being responsive to the first control signal to output one of the first clock signal and the second clock signal;*

*a counter for counting a main clock signal to reset the addresses when a count value reaches a prescribed value; and*

*a first logic gate coupled for receiving the output of said counter and the output of said multiplexer and performing a first logical operation to output a preset signal which presets the addresses for a predetermined period of time.*

*43. The controller of claim 42, wherein said address controller further comprises:*

*a first delay for delaying the first clock signal prior to input to said multiplexer;*

*a second delay for delaying the second clock signal prior to input to said multiplexer; and*

*a third delay for delaying the output of the multiplexer prior to input to said first logic gate.*

*44. The controller of claim 42, wherein said control circuit comprises:*

*a second logic gate for receiving the video mode signal;*

*a third logic gate for receiving the video mode signal and the mode coding type signal and providing the second control signal; and*

*a fourth logic gate receiving an output of said second logic gate and the motion coding type signal, and providing the first control signal.*

*45. The controller of claim 44, wherein said first, second and third logic gates are AND gates and said fourth logic gate is an exclusive OR gate.*

*46. An image motion compensating address generator for generating addresses of a memory, comprising:*

*a selector that selects one of a field unit and a frame unit according to a video mode signal and a slice position signal indicative of a position of a slice;*

*an address controller that controls a generation of addresses according to the video mode signal and a motion coding signal indicative of the video processing mode;*

*an address generator responsive to outputs of said mode selector and said address controller, first and second motion vector signals and a field selection signal to generate the addresses; and*

*a controller for selectively outputting the addresses based on an operational mode for the memory and the second motion vector signal.*

*47. The image motion compensating address generator of claim 46, wherein the video mode signal comprises first and second bits and each bit has a binary value, the video mode signal being indicative of the frame unit when the first and second bits have a same binary value and the video mode signal being indicative of the field unit when the first and second bits have different binary values.*

*48. The image motion compensating address generator of claim 47, wherein the motion coding type signal is indicative of field base mode or frame base mode when the first and second bits are indicative of the frame unit, or is indicative of field base mode or N-by-M base mode when the first and second bits are indicative of the field unit, where N and M are integers greater than zero.*

*49. The image motion compensating address generator of claim 46, wherein said selector comprises:*

*a video mode selector selects one of the frame unit and the field unit based on the video mode signal; and*

*a mode processor coupled for receiving an output of said video mode selector and the slice position signal and outputting a prescribed multiple of the slice position signal based on whether the output of said video mode selector indicates one of field unit and frame unit.*

*50. The image motion compensating address generator of claim 49, wherein the slice position signal is provided as the output of said mode processor when the output of said video mode selector indicates the frame unit, and the prescribed multiple is two when the output of said video mode selector indicates the field unit.*

*51. The image motion compensating address generator of claim 46, wherein said address generator comprises:*

*a first read and write address generator coupled to said selector and said address selection controller and responsive to the first motion vector signal to generate one of first read address and first write address; and*

*a second read and write address generator coupled to said first read and write address generator and responsive to the second motion vector signal and a processed block position signal to generate one of second read address and second write address.*

*52. The image motion compensating address generator of claim 51, wherein said controller comprises:*

*a first selector coupled to said first read and write address generator for providing one of the first read address and first write address when the operational mode of the memory is one of a read operation and a write operation, respectively;*

*a phase generator coupled to said second read and write address generator for dividing the second read address into a plurality of phases based on the second motion vector signal and the operational mode; and*

*a second selector coupled to said second read and write address generator and said phase generator and providing one of the second write address and the second read address of different phases when the operational mode of the memory is one of a read operation and a write operation, respectively.*

*53. The image motion compensating address generator of claim 51, wherein said first read and write address generator comprises:*

*a Y-direction read address generator coupled to said selector and address controller and responsive to the first motion vector signal to generate a Y-direction read address; and*

*a Y-direction write address generator coupled to said Y-direction read address generator, said selector and said second read and write address generator to generate a Y-direction write address.*

*54. The image motion compensating address generator of claim 51, wherein said second read and write address generator comprises:*

*an X-direction read address generator coupled to said address controller and responsive to the second motion vector signal and a processed-block position signal to generate an X-direction read address; and*

*an X-direction write address generator coupled to said first read and write address generator and responsive to the processed block position signal to generate an X-direction write address.*

*55. The image motion compensating address generator as claimed in claim 29, wherein the first direction is a Y-direction, and the second direction is an X-direction.*

* * * * *